United States Patent
Takizawa et al.

[11] Patent Number: 5,995,479
[45] Date of Patent: Nov. 30, 1999

[54] OPTICAL HEAD ADJUSTING APPARATUS

[75] Inventors: Teruyuki Takizawa, Neyagawa; Yoshihiro Ikawa, Higashiosaka; Kenji Akimaru, Moriguchi; Koji Miyata, Matsuyama, all of Japan

[73] Assignee: Matsushita Electric Indsutrial Co., Ltd., Osaka-Fu, Japan

[21] Appl. No.: 08/941,984

[22] Filed: Oct. 1, 1997

[30] Foreign Application Priority Data

Oct. 11, 1996 [JP] Japan ................................ 8-269562

[51] Int. Cl.⁶ .................................................. G11B 17/30
[52] U.S. Cl. .......................................................... 369/219
[58] Field of Search .................................. 369/219, 215, 369/220, 221, 244; 360/105, 106

[56] References Cited

U.S. PATENT DOCUMENTS

| | | |
|---|---|---|
| 4,958,336 | 9/1990 | Suzuki et al. . |
| 5,111,088 | 5/1992 | Fujino ..................... 369/219 |
| 5,138,605 | 8/1992 | Shtipelman et al. . |
| 5,189,660 | 2/1993 | Caldwell ................. 369/219 |
| 5,305,299 | 4/1994 | Maeda . |
| 5,610,885 | 3/1997 | Takahashi . |
| 5,615,204 | 3/1997 | Watanabe et al. ....... 369/219 |
| 5,764,618 | 6/1998 | Kim ........................ 369/219 |

FOREIGN PATENT DOCUMENTS

| | | |
|---|---|---|
| 02094115 | 4/1990 | Japan . |
| 03225627 | 10/1991 | Japan . |
| 05144012 | 6/1993 | Japan . |
| 07320290 | 12/1995 | Japan . |

Primary Examiner—Allen T. Cao
Attorney, Agent, or Firm—Akin, Gump, Strauss, Hauer & Feld, L.L.P.

[57] ABSTRACT

The swing centers of guide shafts in inclination adjustment of an optical head are set to be on a plane which is perpendicular to a predetermined radial direction of an optical disk and has thereon the rotation axis of a disk motor. When the inclination adjustment of the optical head is conducted, relative gap variation between the optical head and the optical disk does not occur, and the inclination adjustment is realized within a movable range of an objective lens. The inclination angle of the optical head in a radial direction of the optical disk is adjusted by simultaneously moving upward or downward ends of two guide shafts, and the inclination angle of the optical head in a tangential direction of the optical disk can be adjusted by moving upward and downward one end of at least one of the guide shafts.

15 Claims, 14 Drawing Sheets

OPTICAL HEAD ADJUSTING APPARATUS

BACKGROUND OF THE INVENTION

The invention relates to an optical head adjusting apparatus which adjusts an angle formed between a normal to the face of an optical disk and the optical axis of an optical head in an optical disk apparatus.

An optical head adjusting apparatus of a first prior art is disclosed in the Japanese published unexamined patent application Hei 2-94115.

FIG. 11 is a side view of the first prior art optical head adjusting apparatus. Hereinafter, the configuration and operation of the apparatus will be described with reference to this figure.

A disk motor 49 which rotatably supports an optical disk 33 is fixed to a base frame 50.

An optical head 51 is supported by a guide shaft 52 and a roller 34 which is disposed on a side face of the optical head 51. The roller 34 engages with a groove (not shown) formed on the base frame 50, thereby enabling the optical head 51 to move in a radial direction of the optical disk 33 which is indicated by an arrow 10 (hereinafter, the direction is referred to as "radial direction 10").

An end portion 52a of the guide shaft 52 which is closer to the disk motor 49 is pivotally supported via a leaf spring 35 by a supporting part 36 which is disposed on the base frame 50.

A part of the guide shaft 52 in the vicinity of the other end 52b engages with a groove-like portion (not shown) of a supporting part 5b which is disposed on the base frame 50, so as to be slidable in the direction perpendicular to the base frame 50. The other end 52b of the guide shaft 52 engages with a spiral cam groove 37a of a cylindrical cam gear 37 disposed on the base frame 50.

The first prior art optical head adjusting apparatus operates in the following manner.

The optical head 51 detects the inclination of the optical head 51 with respect to the radial direction 10 of the face of the optical disk 33. Specifically, the optical head detects whether an angle formed by the optical axis 1a of the optical head 51 and the face of the optical disk 33 is 90 deg. or not. If the angle is not 90 deg., the cylindrical cam gear 37 is rotated. The rotating operation of the cylindrical cam gear 37 causes the other end 52b of the guide shaft 52 engaging with the spiral cam groove 37a to vertically move, so that the guide shaft 52 is swung about the supporting part 36 functioning as the fulcrum. When the guide shaft 52 swings, also the optical head 51 supported by the guide shaft 52 is swung. Therefore, the inclination of the optical head 51 can be adjusted so that the optical axis 1a of the optical head 51 forms the angle of 90 deg. with respect to the face of the optical disk 33.

Another optical head adjusting apparatus of a second prior art is disclosed in the Japanese published unexamined patent application Hei 7-320290.

FIG. 12 is a perspective view showing the configuration of main portions of a driving mechanism of the second prior art of the Japanese published unexamined patent application Hei 7-320290.

Referring to FIG. 12, a disk motor 49 which rotatably supports the optical disk 33 is fixed to a base frame 55. An optical head 51 is supported by guide shafts 52 and 53 so as to move in the predetermined radial direction 10 of the optical disk 33.

End portions 52a and 53a of the guide shafts 52 and 53 which are closer to the disk motor 49 are pivotally supported via leaf springs (not shown) by supporting parts 38 and 39 which are disposed on the base frame 55, respectively.

The other ends 52b and 53b of the guide shafts 52 and 53 are supported by a movably supporting mechanism 40 which vertically moves the guide shafts 52 and 53 with respect to the base frame 55.

The optical head adjusting apparatus operates in the following manner.

The optical head 51 detects the inclination of the optical head 51 with respect to the radial direction 10 of the face of the optical disk 33. Specifically, the optical head detects whether an angle formed by the optical axis 1a of the optical head 51 and the face of the optical disk 33 is 90 deg. or not. If the angle is not 90 deg., the movably supporting mechanism 40 vertically moves the guide shafts 52 and 53. The guide shafts 52 and 53 swing about respective supporting parts 38 and 39 which are functioning as fulcrums. When the guide shafts 52 and 53 swing, also the optical head 51 supported by the guide shafts 52 and 53 is swung. Therefore, the angle of the optical head 51 can be adjusted so that the optical axis 1a of the optical head 51 forms the angle of 90 deg. with respect to the face of the optical disk 33.

As the density and capacity of an optical disk are increased, the wavelength of a laser beam of an optical head is made shorter and the NA (numerical aperture) of an objective lens mounted on the optical head is made higher. Therefore, an error of the inclination angle of the optical axis of a laser beam emitted onto the face of the optical disk produces optical aberration in the optical head.

In other words, signal recording and reproducing properties of an optical disk apparatus are largely affected by the error of the inclination angle of the optical axis of the laser beam with respect to the face of the optical disk. In a large-capacity optical disk apparatus, the inclination angle must be adjusted so that an inclination angle error is largely reduced.

Moreover, in order to prevent deteriorations of the signal recording and reproducing properties of the optical disk apparatus, it is essential to conduct the inclination angle adjustment within a movable range of an objective lens used for converging light from the optical head on the optical disk.

Furthermore, "relative gap variation" which is produced as a result of the inclination angle adjustment and which is defined by variation in the distance between the optical head and the optical disk must be reduced to a level as low as possible.

In the afore-mentioned configuration of the first prior art optical head adjusting apparatus disclosed in the Japanese published unexamined patent application Hei 2-94115, the inclination of the optical head 51 with respect to the radial direction 10 of the optical disk 33 can be adjusted. However, the inclination of the optical head 51 with respect to a tangential direction of the optical disk 33 which is perpendicular to the radial direction 10 cannot be adjusted.

In the first and second prior arts of optical head adjusting apparatuses disclosed in the Japanese published unexamined patent applications Hei 2-94115 and Hei 7-320290, the supporting parts 36 of the base frame 50, or the supporting parts 38 and 39 fixed to the base frame 55 are placed at respective positions which are separated from the rotation axis 4a of the disk motor 49. When the guide shafts 52 and 53 swing about the supporting parts 38 and 39 functioning as the fulcrums, for example, the relative gap variation occurs between the optical head 51 and the face of the optical disk 33.

FIG. 13 is a diagram showing the relative gap variation between the optical head 51 and the optical disk 33 in the optical head adjusting apparatus of the second prior art.

Referring to FIG. 13, the positions of the supporting parts 38 and 39 which are disposed on the base frame 55 have a height h and are separated from the rotation axis 4a of the disk motor 49. The horizontal distance between each supporting part 38 or 39 and the rotation axis 4a is indicated by G. It is assumed that the rotation axis 4a of the disk motor 49 is inclined by an angle θ with respect to the base frame 55 and oriented in the direction of an arrow 4b. The design value of the relative gap which is the distance between the optical head 51 and the optical disk 33 is indicated by H0.

Under this state, in order to adjust the angle of the optical axis 1a of the optical head 51 with respect to the face of the optical disk 33, the guide shafts 52 and 53 are rotated by the angle θ about the upper points 38a and 39a of the supporting parts 38 and 39, respectively. As a result, a relative gap H1 between the optical head 51 and the optical disk 33 after adjustment becomes a value shown in expression 1. Furthermore, a relative gap variation ΔH is indicated by expression 2.

$$H1 = H0 + G \sin \theta + h(1 - \cos \theta) \qquad (1)$$

$$\Delta H = G \sin \theta + h(1 - \cos \theta) \qquad (2)$$

In the relative gap variation ΔH, the amount of height variation corresponding to the second term (3) of the right side is very small and hence is negligible. However, the amount of height variation corresponding to the first term (4) of the right side cannot be neglected because the movable range of the objective lens is limited to a very short length (for example, ±0.8 mm to ±1.0 mm).

$$h(1 - \cos \theta) \qquad (3)$$

$$G \sin \theta \qquad (4)$$

As described above, in the optical head adjusting apparatuses of the prior art, the positions of the supporting parts 38 and 39 disposed on the base frame 55 are separated from the rotation axis 4a of the disk motor 49. Therefore, such apparatuses have a problem in that, when the inclination of the optical head 51 is adjusted, the relative gap between the optical head 51 and the optical disk 33 is varied and the distance between the optical head 51 and the optical disk 33 is changed, with the result that the optical disk apparatus cannot satisfactorily perform recording and reproducing operations.

BRIEF SUMMARY OF THE INVENTION

The invention has been conducted in order to solve the above-discussed problem. It is an object of the invention to provide an optical head adjusting apparatus which can accurately adjust the inclination angle of the optical axis of a laser beam with respect to radial and tangential directions of an optical disk, and in which relative gap variation between the optical head and the optical disk that is due to the adjustment can be eliminated, thereby enabling an inclination angle adjustment of the optical head to be realized within a movable range of an objective lens.

The optical head adjusting apparatus of a first aspect of the invention comprises: a disk motor which rotatably supports an optical disk; a base frame to which the disk motor is fixed; and an optical head which forms an optical spot on the rotating optical disk and which records information onto or reproduces information from the optical disk. The apparatus further comprises: a pair of guide shafts which support the optical head for moving in a predetermined radial direction of the optical disk; guide shaft support members which pivotally support ends of the pair of guide shafts to the base frame, on a plane which is perpendicular to the radial direction and has thereon the rotation axis of the disk motor; and a guide shaft adjustment mechanism which is fixed to the base frame and which movably supports other ends of the pair of guide shafts in a direction which is perpendicular to the optical disk. The inclination of the optical head with respect to the radial direction of the optical disk can be adjusted by simultaneously moving the other ends of the pair of guide shafts in a direction which is substantially perpendicular to the face of the optical disk. Furthermore, the inclination angle of the optical head with respect to a tangential direction of the optical disk which is perpendicular to the predetermined radial direction can be adjusted by moving the other end of at least one of the pair of guide shafts in a direction which is substantially perpendicular to the face of the optical disk.

The optical head adjusting apparatus of a second aspect of the invention comprises: a feed screw shaft which supports an optical head and which enables the optical head to linearly move in a predetermined radial direction of an optical disk; a feed motor which is fixed to a base frame and which drives the feed screw shaft to rotate, via transmission driving means; and a screw engaging member which engages with a screw portion of the feed screw shaft so as to be given a driving force in an axial direction of the feed screw shaft by means of rotation of the feed screw shaft, and which is fixed to the optical head. The optical head adjusting apparatus further comprises: a guide shaft which movably supports the optical head in the predetermined radial direction; a first bearing member which pivotally supports one end of the feed screw shaft on a plane which is perpendicular to the predetermined radial direction of the optical disk and has thereon the rotation axis of the disk motor; a guide shaft support member which pivotally support an end of the guide shaft in the plane; a second bearing member which movably supports another end of the feed screw shaft; and a guide shaft adjustment mechanism which is fixed to the base frame and which movably supports another end of the guide shaft and the second bearing member in a direction which is substantially perpendicular to the face of the optical disk. The inclination of the optical head with respect to the predetermined radial direction of the optical disk can be adjusted by simultaneously moving an end of the guide shaft and the second bearing member in a direction which is substantially perpendicular to the optical disk. The inclination of the optical head with respect to a tangential direction of the optical disk which is perpendicular to the predetermined radial direction can be adjusted by moving the end of the guide shaft or the second bearing member in a direction which is substantially perpendicular to the face of the optical disk.

The optical head adjusting apparatus of a third aspect of the invention comprises: a first base frame to which a disk motor is fixed; a feed screw shaft which supports an optical head and which enables the optical head to linearly move in a radial direction of an optical disk; a feed motor which is directly coupled to the feed screw shaft to rotate the feed screw shaft, or which rotates the feed screw shaft via rotation transmission means; and a screw engaging member which engages with a screw portion of the feed screw shaft so as to be given a driving force in an axial direction of the feed screw shaft by means of rotation of the feed screw shaft, and which is fixed to the optical head. The optical head adjusting apparatus further comprises: a guide shaft which supports the optical head with enabling the optical head to move in a predetermined radial direction; a first bearing member which pivotally supports one end of the feed screw shaft on the first base frame, on a plane which is perpendicular to the predetermined radial direction and has thereon the rotation axis of the disk motor; a guide shaft support member which pivotally support an end of the guide shaft to the first base frame in the plane which is perpendicular to the predetermined radial direction and has thereon the rotation axis of the disk motor; and a first guide shaft adjustment mechanism which is fixed to the first base frame and which supports another end of the guide shaft with enabling the guide shaft to move in a direction which is substantially perpendicular to the face of the optical disk. The optical head adjusting apparatus further comprises: a second bearing member which rotatably supports another end of the feed screw shaft; and a second guide shaft adjustment mechanism which is fixed to a sub-frame to which the second bearing member and the feed motor are fixed, and which supports the sub-frame with enabling the sub-frame to move in a direction which is perpendicular to the optical disk. The inclination of the optical head with respect to the predetermined radial direction of the optical disk can be adjusted by moving simultaneously an end of the guide shaft and the sub-frame in a direction which is perpendicular to the face of the optical disk. The inclination of the optical head with respect to a tangential direction of the optical disk which is perpendicular to the predetermined radial direction can be adjusted by moving the end of the guide shaft or the sub-frame in a direction which is substantially perpendicular to the face of the optical disk.

In the optical head adjusting apparatus of the first aspect of the invention, the driving means for moving the optical head in the radial direction comprises: a driving coil which is fixed to the optical head; and a magnetic circuit which is movably inserted into the driving coil, in which a magnetic flux direction coincides with the tangential direction of the optical disk which is perpendicular to the radial direction of the optical disk, and which fixed to the base frame. In another configuration, the driving means comprises: a feed screw shaft which is in parallel with the pair of guide shafts; a feed motor which is directly coupled to the feed screw shaft to rotate the feed screw shaft, or which rotates the feed screw shaft via rotation transmission means; and a screw engaging member which pressingly abuts against and engages with a screw portion of the feed screw shaft in a direction perpendicular to the radial direction of the optical head, and which is fixed to the optical head.

In the optical head adjusting apparatuses of the first, second, and third aspects of the invention, the guide shaft adjustment mechanism comprises a mechanism in which a bearing member which supports the guide shaft or the feed screw shaft is clamped by a spring member and an adjusting screw that are disposed in a direction which is substantially perpendicular to the face of the optical disk.

The change of the inclination angle of the optical head with respect to the adjustment rotation angle of the adjusting screw depends on the length of the guide shaft. The length of the guide shaft is sufficiently larger as compared with the adjustment range of the adjusting screw. Therefore, a highly accurate adjusting work can be conducted and the inclination angle can be finely adjusted.

When one end of the guide shaft is moved upward or downward, the guide shaft swings about the other end functioning as a fulcrum. The fulcrum is in the plane which is perpendicular to the predetermined radial direction of the optical disk and has thereon the rotation axis of the disk motor. Even when the inclination adjustment of the optical head is conducted, therefore, the relative gap between the optical head and the optical disk is not varied.

As a result, the inclination angle adjustment of the optical head can be conducted within a movable range of an objective lens which is mounted on the optical head, so that an optical disk apparatus can satisfactorily perform recording and reproducing operations.

In screw feed driving means for moving the optical head supported by the guide shaft in the predetermined radial direction of the optical disk, the screw engaging member is mounted on the optical head so as to pressingly abuts against and engages with the screw portion of the feed screw shaft in a direction perpendicular to the predetermined radial direction of the optical disk. This configuration can realize an excellent engaging state in which, even when the feed screw shaft has a twisted positional relationship with the guide shaft supporting the optical head, load variation does not occur.

As a result, also in the screw feed driving means for moving the optical head in the predetermined radial direction, a stable access operation of the optical head can be realized without being affected by an inclination angle adjustment of the optical head.

In the transmission driving means of the optical head adjusting apparatus of the second aspect of the invention, the feed screw shaft is coupled with a rotating shaft of the feed motor by a contractible belt, thereby transmitting the driving force.

A feeding pulley which is directly connected to the feed screw shaft, and a driving pulley which is directly connected to the feed motor are coupled with each other by a contractible belt such as a rubber belt. According to this configuration, even when the feed screw shaft has a twisted positional relationship with the driving shaft of the feed motor, the rotation force of the feed motor can be surely transmitted to the feed screw shaft, and hence a stable feed driving thrust can be always produced.

Furthermore, in screw feed driving means for moving an optical head supported by the feed screw shaft and the guide shaft in the predetermined radial direction, a rotation support member rotatably supporting the feed screw shaft having a directly coupled feeding gear, and a feed motor having a driving gear engaging with the feeding gear are mounted on a sub-frame which is configured so as to move in a direction which is substantially perpendicular to the face of the optical disk. According to this configuration, also after the inclination angle of the optical head is adjusted, the state of the feeding mechanism transmission system is not changed and hence a stable feeding operation can be realized.

In the optical head adjusting apparatuses of the first, second, and third aspects of the invention, the inclination adjustment of the optical head is conducted in the state where the optical head is held at a radial intermediate position of an information area of the optical disk. According to this adjustment method, an error of the tangential adjustment angle can be made minimum.

DETAILED DESCRIPTION OF THE INVENTION

Hereinafter, embodiments of the invention will be described with reference to FIG. 1 to FIG. 10C.

First Embodiment

A first embodiment of the invention will be described with reference to FIG. 1 and FIG. 2.

Figure 1:
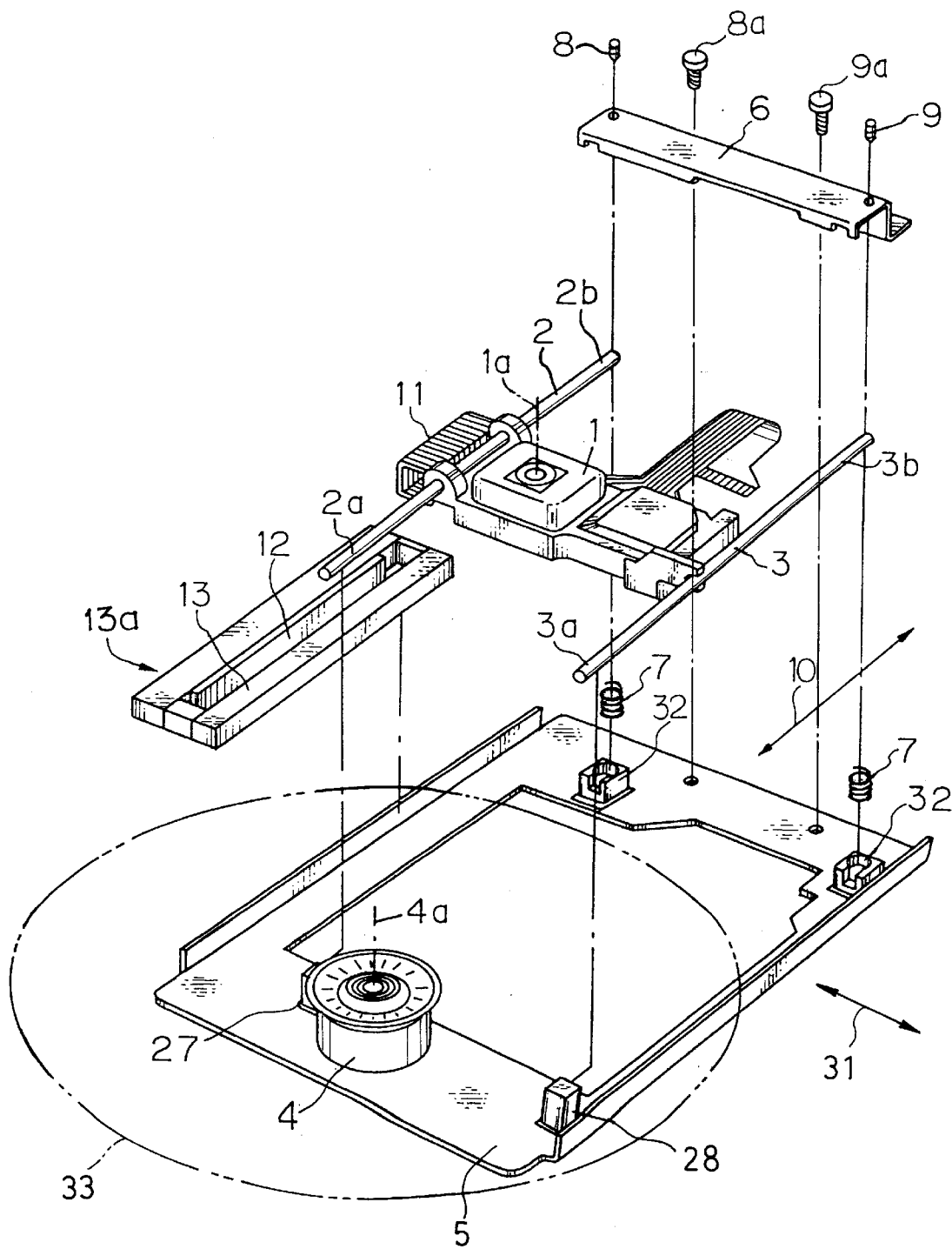
FIG. 1 is an exploded perspective view showing the configuration of an optical head adjusting apparatus of a first embodiment of the invention.
Figure 2:
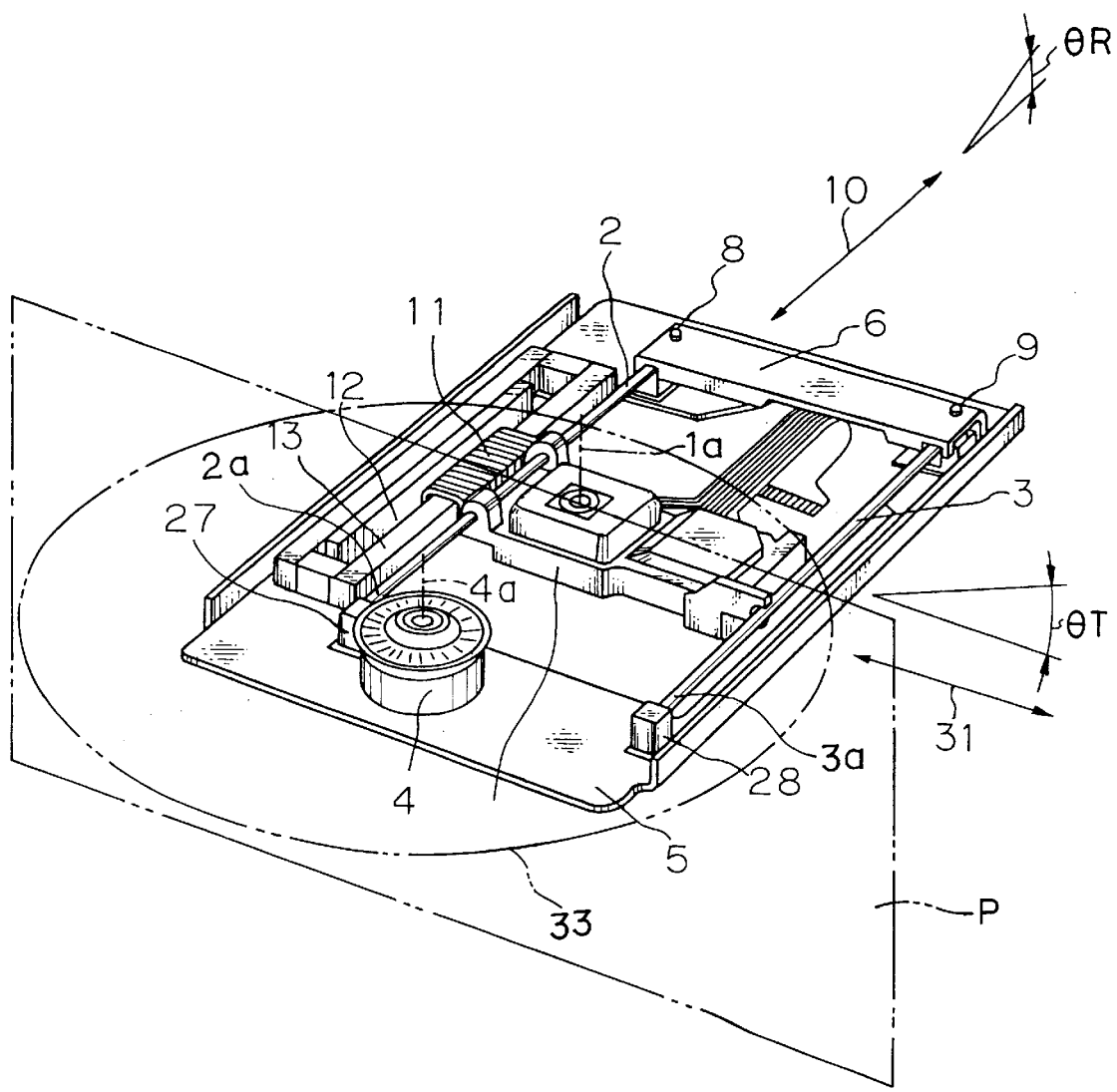
FIG. 2 is a perspective view of the optical head adjusting apparatus of the first embodiment of the invention.

FIG. 1 is an exploded perspective view showing the configuration of an optical head adjusting apparatus of the first embodiment, and FIG. 2 is an assembly perspective view.

Referring to FIG. 1 and FIG. 2, a disk motor 4 is fixed to a base frame 5 and rotatably supports an optical disk 33. An optical head 1 is supported by two guide shafts 2 and 3 which are disposed in parallel with a predetermined radial direction of the optical disk which is indicated by an arrow 10 (hereinafter, the direction is referred to as "the radial direction 10"). The radial direction 10 coincides with a direction to which the optical head 1 moves along the guide shafts 2 and 3.

A driving coil 11 is disposed on a side face of the optical head 1. A magnetic yoke 13 fixed to the base frame 5 is inserted into the driving coil 11. The driving coil 11 can move along the magnetic yoke 13. A magnet 12 is fixed to the magnetic yoke 13 so as to face the driving coil 11.

The magnetic yoke 13 and the magnet 12 constitute a magnetic circuit 13a so as to generate magnetic fluxes in a tangential direction of the optical disk 33 which is indicated by an arrow 31 (hereinafter, the direction is referred to as "the tangential direction 31"). The tangential direction 31 is perpendicular to the radial direction 10 and in parallel with the face of the optical disk 33.

The magnetic circuit 13a and the driving coil 11 constitutes a linear motor. When the linear motor is driven, the optical head 1 moves in the radial direction 10 of the optical disk 33.

End portions 2a and 3a of the guide shafts 2 and 3 which are closer to the disk motor 4 are pivotally supported by guide shaft pivot members 27 and 28 which are fixed on the base frame 5, respectively. The end portions 2a and 3a which serve as fulcrums are set so as to locate on a plane p which is perpendicular to the radial direction 10 and has thereon the rotation axis 4a of the disk motor 4.

The other ends 2b and 3b of the guide shafts 2 and 3 are clamped by coil springs 7 and adjusting screws 8 and 9 attached to an adjustment holder 6, respectively. The adjustment holder 6 is fixed to the base frame 5 by screws 8a and 9a, thereby constituting a guide shaft adjustment mechanism. The other ends 2b and 3b engage with groove-like portions of respective supporting parts 32 which are disposed on the base frame 5, so as to be movable in a vertical-direction. When the adjusting screw 8 or 9 is rotated, the guide shaft 2 or 3 swings about the corresponding end portion 2a or 3a so as to move upward or downward with respect to the base frame 5.

Next, the operation of the optical head adjusting apparatus will be described.

The optical head 1 must be supported so that both the angles of the optical axis 1a with respect to two directions, i.e., the radial direction 10 of the optical disk 33 and the tangential direction 31 which are perpendicular to each other, are 90 deg. In order to set the angles to be 90 deg., an angle error is detected by using well-known angle error detecting means which will be described later, and it is judged in accordance with the detection result whether the angles are 90 deg. or not. Generally, it is known that, when a relative inclination angle error exists between an optical head and a face of an optical disk, optical aberration is produced in proportion to the cube of the NA (Numerical Aperture) of an objective lens. When the aberration is increased, the waveform of the reproduced signal of the optical head is distorted and jitter of the reproduced signal is impaired.

In the detection of the relative inclination angle error existing between an optical head and a face of an optical disk, an angle detection sensor is used, or the relative inclination angle error is detected from the degree of impairment of jitter of a reproduced signal. These methods are well known in the field of the art, and hence their detailed description is omitted.

When both the angles are 90 deg., satisfactory states of recording and reproducing operations are maintained in the optical disk apparatus. Therefore, it is not required to conduct the inclination adjustment on the optical head 1. If the angle of the optical axis 1a with respect to the radial direction 10 of the optical disk 33 or the tangential direction 31 is not 90 deg., the inclination adjustment of the optical head 1 must be conducted.

Next, description is made as to the operation in the case where the inclination of the optical head 1 in the radial direction 10 of the optical disk 33 is adjusted. The inclination adjustment is conducted in an adjustment step of production process of the optical disk recording and reproducing apparatus.

The guide shafts 2 and 3 are simultaneously rotated about the respective end portions 2a and 3a by concurrently rotating the adjusting screws 8 and 9. As a result, the inclination of the optical head 1 supported by the guide shafts 2 and 3 is changed with respect to the radial direction 10. In an actual adjustment step, the adjusting screws 8 and 9 are rotated by well-known rotating means which are automatically controlled, such as a servomotor. In order to simplify the description of the embodiments, the illustration and description of the rotating means are omitted.

According to this operation, the inclination of the optical head 1 can be changed by a radial adjust angle θR, so that the angle formed by the face of the optical disk 33 and the optical axis 1a in the radial direction 10 is adjusted to 90 deg.

Next, description is made as to the operation in the case where the inclination of the optical head 1 in the tangential direction 31 of the optical disk is adjusted.

For example, the adjusting screw 9 is rotated so that only the guide shaft 3 swings about the end 3a of the guide shaft 3, thereby upward or downward moving the end portion 3b with respect to the face of the optical disk 33. As a result, the guide shaft 3 is inclined with respect to the guide shaft 2, and the inclination of the optical head 1 supported by the guide shafts 2 and 3 is changed with respect to the tangential direction 31.

According to this operation, the inclination of the optical head 1 in the tangential direction 31 can be changed by a tangential adjust angle θT, so that the angle formed by the face of the optical disk 33 and the optical axis 1a in the tangential direction 31 is adjusted to 90 deg.

The inclination adjustments of the optical head 1 with respect to the radial direction 10 and the tangential direction 31 are independently conducted, and thereby the angles formed by the face of the optical disk 33 and the optical axis 1a of the optical head 1 can be adjusted to 90 deg with respect to the radial direction 10 and the tangential direction 31. Therefore, satisfactory states of recording and reproducing operations can be realized in the optical disk apparatus.

Since the inclination angle of the optical head 1 is changed by moving upward or downward the end portion 2b or 3b of the guide shaft 2 or 3, the ratio of the inclination angle of the optical head 1 to the rotation angle of the adjusting screws 8 or 9 depends on the length of the guide shaft 2 or 3. The length of the guide shafts 2 and 3 is made sufficiently larger as compared with the adjustment range of the adjusting screws 8 and 9. Therefore, a highly accurate adjusting work can be conducted and the inclination angle can be finely adjusted.

The guide shaft support members 27 and 28 are supported by the base frame 5 on the plane p which is perpendicular to the radial direction 10 and has thereon the rotation axis 4a of the disk motor 4. When the inclination of the optical head 1 is adjusted, therefore, a relative gap variation which appears as a change of the distance between the optical head 1 and the optical disk 33 does not occur. The relative gap variation occurs in the optical head adjusting apparatus of the prior art. As a result, an inclination angle adjustment of the optical head 1 can be realized within the movable range of the objective lens (not shown) mounted on the optical head 1, so that an optical disk apparatus can satisfactorily perform recording and reproducing operations.

The magnetic circuit 13a configured by the magnet 12 and the magnetic yoke 13 generates magnetic fluxes in the tangential direction 31 of the optical disk. Even when the optical head 1 is inclined by the radial adjust angle θR and the tangential adjust angle θT as a result of the inclination angle adjustment, therefore, the amount of magnetic fluxes passing through the driving coil 11 is not changed and the thrust of the linear motor is always stably generated.

As a result, a stable access operation of the optical head 1 can be realized without being affected by the inclination angle adjustment of the optical head 1.

Second Embodiment

A second embodiment of the invention will be described with reference to FIG. 3 and FIG. 4.

Figure 3:
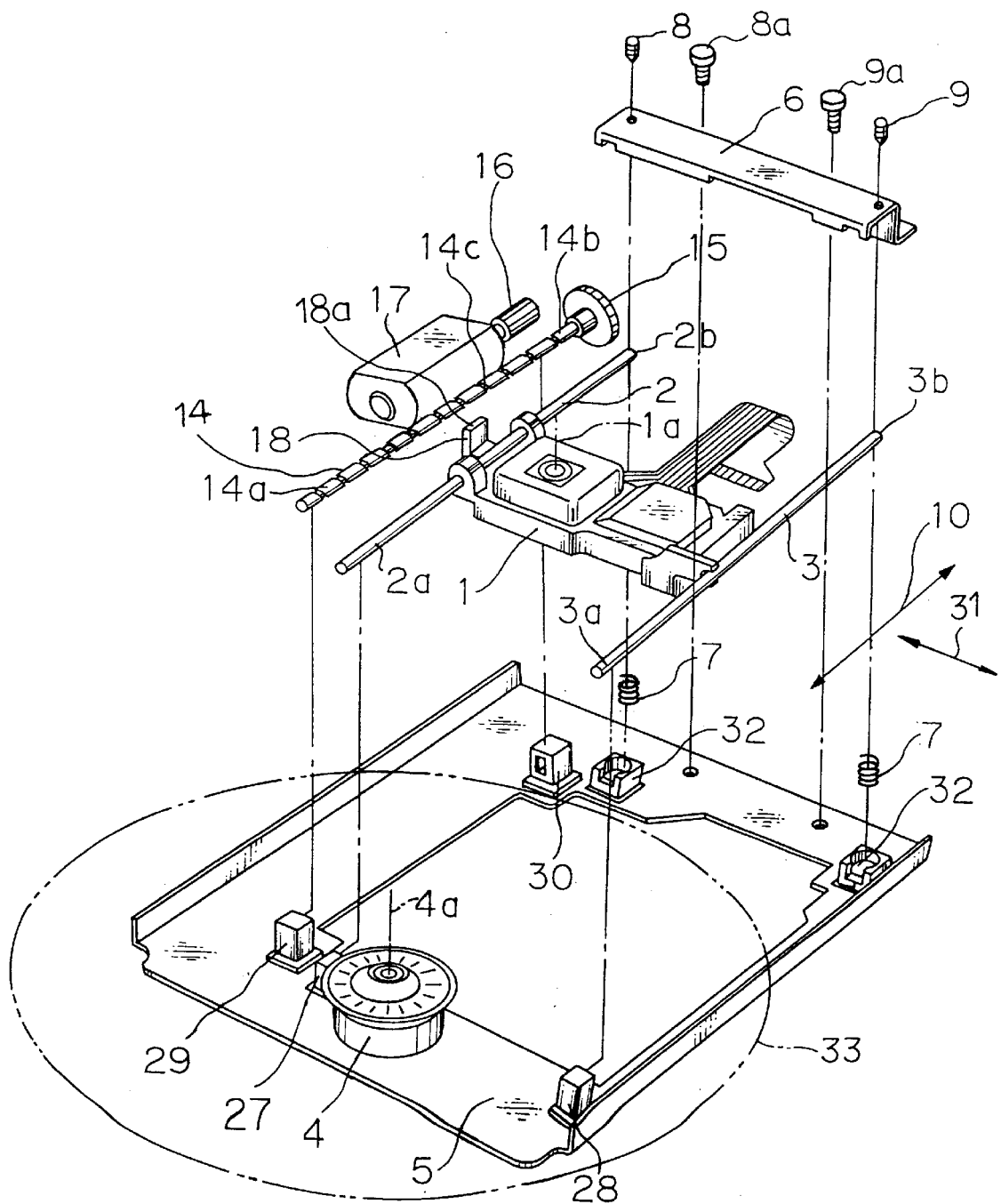
FIG. 3 is an exploded perspective view showing the configuration of an optical head adjusting apparatus of a second embodiment of the invention.
Figure 4:
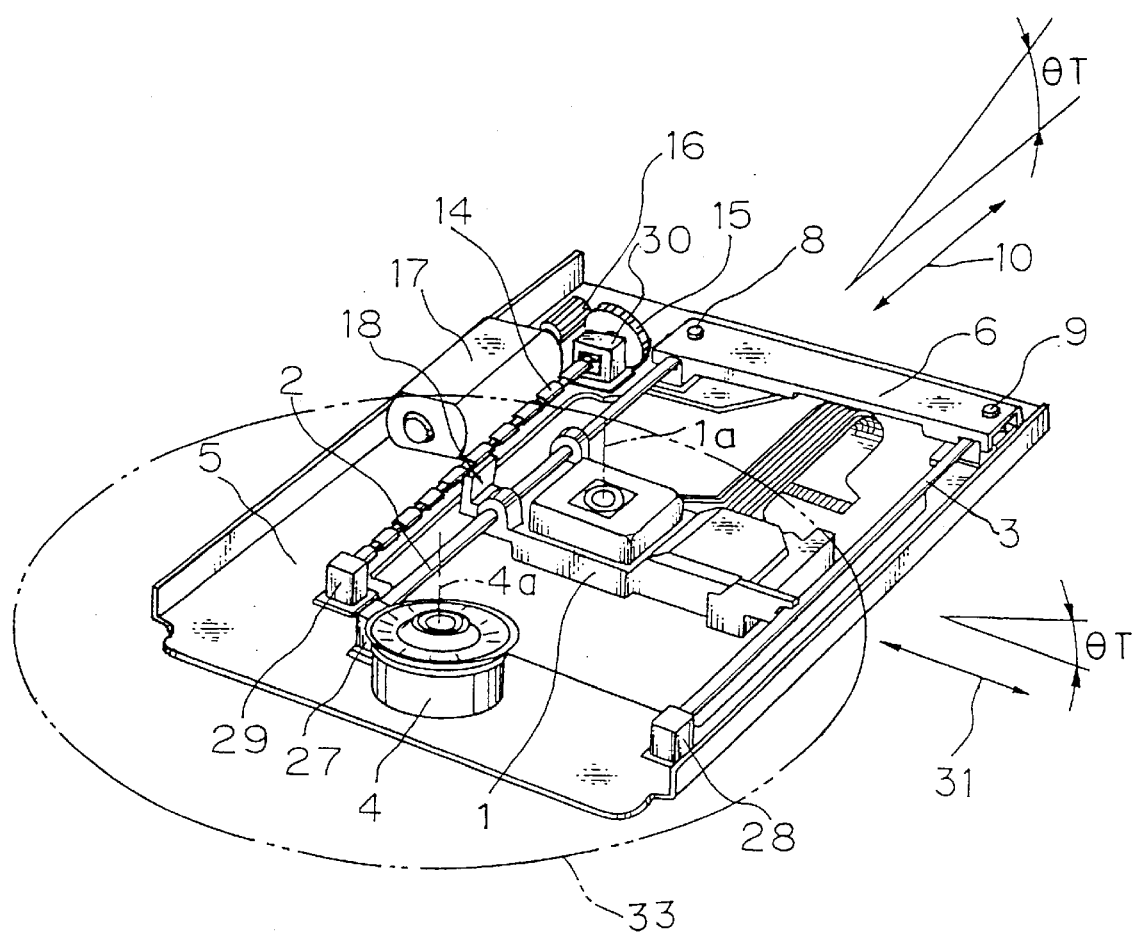
FIG. 4 is a perspective view of the optical head adjusting apparatus of the second embodiment of the invention.

FIG. 3 is an exploded perspective view showing the configuration of an optical head adjusting apparatus of the second embodiment, and FIG. 4 is an assembly perspective view.

Referring to FIG. 3 and FIG. 4, the disk motor 4 which rotatably supports the optical disk 33 is fixed to the base frame 5. The optical head 1 is supported by the guide shafts 2 and 3 which are disposed on the base frame 5 in parallel with the radial direction 10 of the optical disk 33.

A feed screw shaft 14 to which a feeding gear 15 is attached is disposed in parallel with the guide shafts 2 and 3. An end 14a of the feed screw shaft 14 which is closer to the disk motor 4, and the other end 14b are rotatably supported by bearing support members 29 and 30 which are disposed on the base frame 5, respectively.

A feed motor 17 to which a driving gear 16 is attached is fixed to the base frame 5 so that the feeding gear 15 engages with the driving gear 16.

A screw engaging member 18 is fixed to a side face of the optical head 1. An engaging portion 18a of the engaging member 18 is pressed against a screw portion 14c of the feed screw shaft 14 in the tangential direction 31 of the optical disk so as to engage therewith.

When the feed screw shaft 14 is rotated by the rotation of the feed motor 17, the screw engaging member 18 engaging with the screw portion 14c of the feed screw shaft 14 is given a driving force in the axial direction of the feed screw shaft 14.

As a result, the optical head 1 moves in the radial direction 10 of the optical disk.

The configuration and operation of the adjustment mechanism for the guide shafts 2 and 3 are the same as those of the first embodiment of the invention, and hence their description is omitted.

In the second embodiment, the screw engaging member 18 is pressed against the screw portion 14c of the feed screw shaft 14 in the tangential direction 31 of the optical disk so as to engage therewith. Even when the feed screw shaft 14 has a twisted positional relationship with the guide shafts 2 and 3, therefore, an excellent engaging state can be maintained.

Even when the optical head 1 is inclined by the radial adjust angle θR and the tangential adjust angle θT as a result of the inclination angle adjusting operation, the load of the screw feed transmission system including the feeding gear 15, the driving gear 16, and the feed screw shaft 14 can be prevented from being varied.

As a result, a stable high-speed-access operation of the optical head 1 can be realized without being affected by operation of adjusting the inclination angle of the optical head 1.

Third Embodiment

A third embodiment of the invention will be described with reference to FIG. 5 and FIG. 6.

Figure 5:
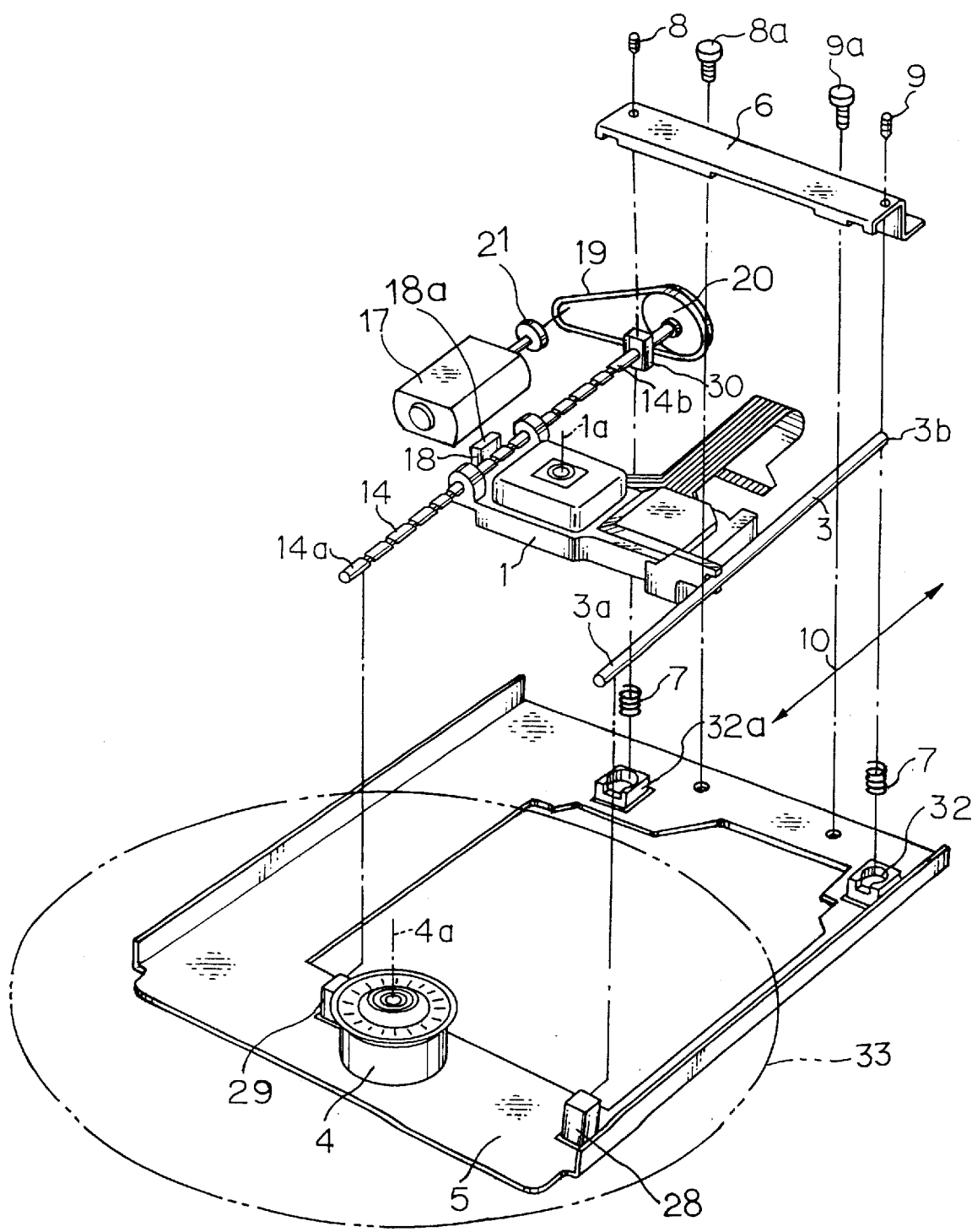
FIG. 5 is an exploded perspective view showing the configuration of an optical head adjusting apparatus of a third embodiment of the invention.
Figure 6:
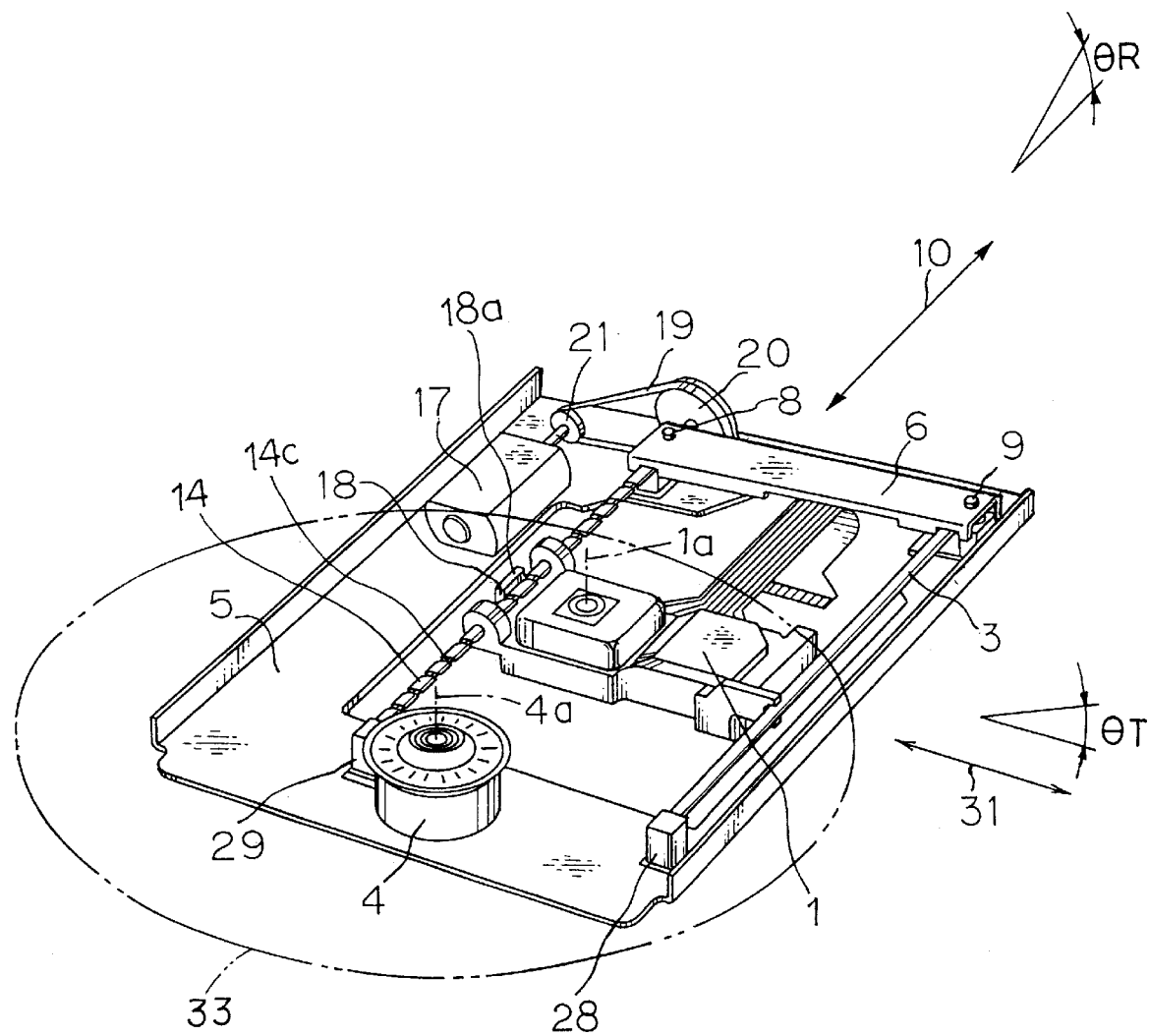
FIG. 6 is a perspective view of the optical head adjusting apparatus of the third embodiment of the invention.

FIG. 5 is an exploded perspective view showing the configuration of an optical head adjusting apparatus of the third embodiment, and FIG. 6 is an assembly perspective view.

Referring to FIG. 5 and FIG. 6, the disk motor 4 is fixed to the base frame 5 and rotatably supports an optical disk 33. The feed screw shaft 14 which is a threaded guide shaft and has a feeding pulley 20 at its one end is rotatably supported so as to be in substantially parallel with the radial direction 10, by bearing support members 29 and 30. One end of the guide shaft 3 is pivotally supported in parallel with the radial direction 10 by the guide shaft pivoting member 28. The bearing support member 30 and the other end of the guide shaft 3 are adjustably supported by the supporting parts 32a and 32, which are disposed on the base frame 5. The optical head 1 is supported by the feed screw shaft 14 and the guide shaft 3 which are disposed in parallel with the radial direction 10 of the optical disk 33.

The feed motor 17 to which a driving pulley 21 is attached is fixed to the base frame 5 under the state where the driving pulley 21 and the feeding pulley 20 are coupled with each other by a contractible belt 19 such as a rubber belt.

The screw engaging member 18 is fixed to a side face of the optical head 1. An engaging portion 18A of the screw engaging member 18 is pressed against a screw portion 14c of the feed screw shaft 14 so as to engage therewith.

When the feed screw shaft 14 is rotated by the rotation of the feed motor 17, the screw engaging member 18 engaging with the screw portion 14c of the feed screw shaft 14 is given a driving force in the axial direction of the feed screw shaft 14.

As a result, the optical head 1 to which the screw engaging member 18 is fixed moves in the radial direction 10 of the optical disk.

The end portion 14a of the feed screw shaft 14 and the end portion 3a of the guide shaft 3 which are closer to the disk motor 4 and serve as fulcrums are pivotally supported by the bearing support member 29 and the guide shaft support member 28 which are fixed to the base frame 5 so as to locate on a plane which is perpendicular to the radial direction 10 and has thereon the rotation axis 4a of the disk motor 4, respectively.

The other end portion 14b of the feed screw shaft 14 is clamped by the coil spring 7 and the adjusting screw 8 attached to the adjustment holder 6, via a bearing support member 30. The fixation of the adjustment holder 6 to the base frame 5 causes the bearing support member 30 to engage with a groove-like portion of the supporting part 32a which is disposed on the base frame 5. According to this configuration, the other end portion 14b is movable in a direction perpendicular to the face of the optical disk 33.

The other end portion 3b of the guide shaft 3 is clamped by the coil spring 7 and the adjusting screw 9 attached to the adjustment holder 6. The fixation of the adjustment holder 6 to the base frame 5 causes the other end portion 3b to engage with a groove-like portion of another supporting part 32 which is disposed on the base frame 5, to be movable in a direction perpendicular to the face of the optical disk 33.

In the guide shaft adjustment mechanism, when the adjusting screws 8 and 9 are rotated, the feed screw shaft 14 and the guide shaft 3 swing about the end 14a of the feed screw shaft 14 and the end 3a of the guide shaft 3, respectively, so as to move upward or downward with respect to the base frame 5.

The optical head adjusting apparatus operates in the following manner.

The feed screw shaft 14 and the guide shaft 3 are simultaneously swing about the one end 14a of the feed screw shaft 14 and the one end 3a of the guide shaft 3 as the fulcrums by concurrently rotating the adjusting screws 8 and 9. As a result, the inclination of the optical head 1 supported by the feed screw shaft 14 and the guide shaft 3 is changed with respect to the radial direction 10.

According to this operation, the inclination of the optical head 1 with respect to the radial direction 10 can be changed by a radial adjust angle θR, so that the angle formed by the face of the optical disk 33 and the optical axis 1a in the radial direction 10 is adjusted to 90 deg.

Next, description is made as to the operation in the case where the inclination of the optical head 1 in the tangential direction 31 of the optical disk is adjusted.

For example, the adjusting screw 9 is rotated so that only the guide shaft 3 swings about the one end 3a of the guide shaft 3, thereby upward or downward moving the guide shaft 3 with respect to the base frame 5. As a result, the guide shaft 3 is inclined with respect to the feed screw shaft 14, and the inclination of the optical head 1 supported by the feed screw shaft 14 and the guide shaft 3 is changed with respect to the tangential direction 31.

According to this operation, the inclination of the optical head 1 with respect to the tangential direction 31 can be changed by a tangential adjust angle θT, so that the angle formed by the face of the optical disk 33 and the optical axis 1a in the tangential direction 31 is adjusted to 90 deg.

Since the inclination adjustments of the optical head 1 in the radial direction 10 and the tangential direction 31 are independently conducted, both the angles formed by the face of the optical disk 33 and the optical axis 1a of the optical head 1 can be adjusted to 90 deg. Therefore, satisfactory states of recording and reproducing operations can be realized in the optical disk apparatus.

The bearing support member 29 and the guide shaft support member 28 are disposed on the base frame 5 on the plane which is perpendicular to the radial direction 10 and has thereon the rotation axis 4a of the disk motor 4. Even when the inclination of the optical head 1 is adjusted, therefore, the relative gap variation between the optical head 1 and the optical disk 33 which appears in an optical head adjusting apparatus of the prior art does not occur.

As a result, an inclination angle adjustment can be realized within the movable range of the objective lens (not shown) mounted on the optical head 1, so that the optical disk apparatus can satisfactorily perform recording and reproducing operations.

The driving pulley 21 and the feeding pulley 20 are connected with each other by the contractible belt 19 such as a rubber belt. Even when the optical head 1 is inclined by the radial adjust angle θR and the tangential adjust angle θT as a result of the inclination angle adjusting operation, therefore, a torque of the feed motor 17 can be surely transmitted to the feed screw shaft 14, so that a stable feed driving force can be always produced.

As a result, a stable high-speed-access operation of the optical head 1 is realized without being affected by operation of adjusting the inclination angle of the optical head 1.

Fourth Embodiment

A fourth embodiment of the invention will be described with reference to FIG. 7 to FIG. 10C.

Figure 7:
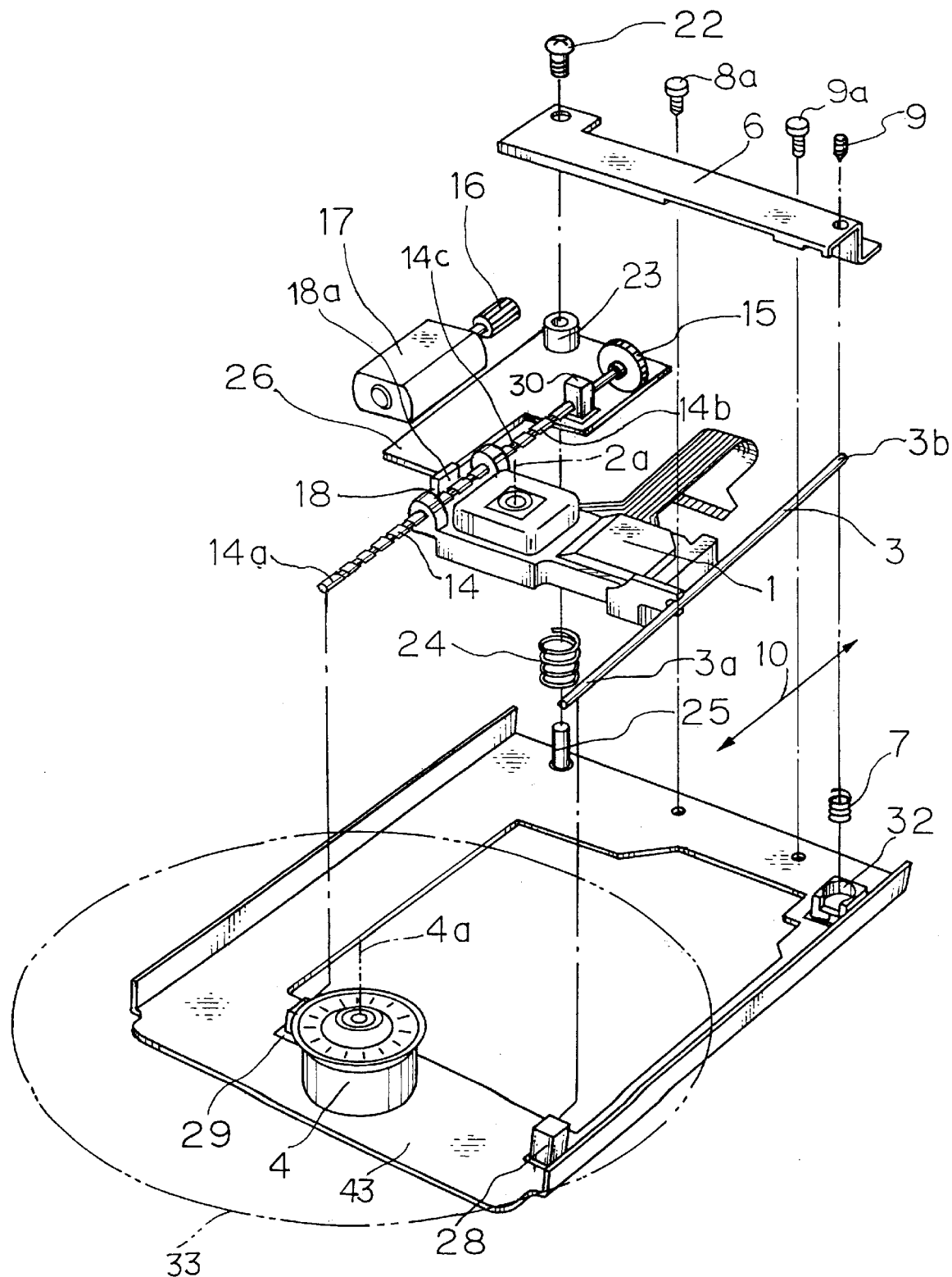
FIG. 7 is an exploded perspective view showing the configuration of an optical head adjusting apparatus of a fourth embodiment of the invention.
Figure 8:
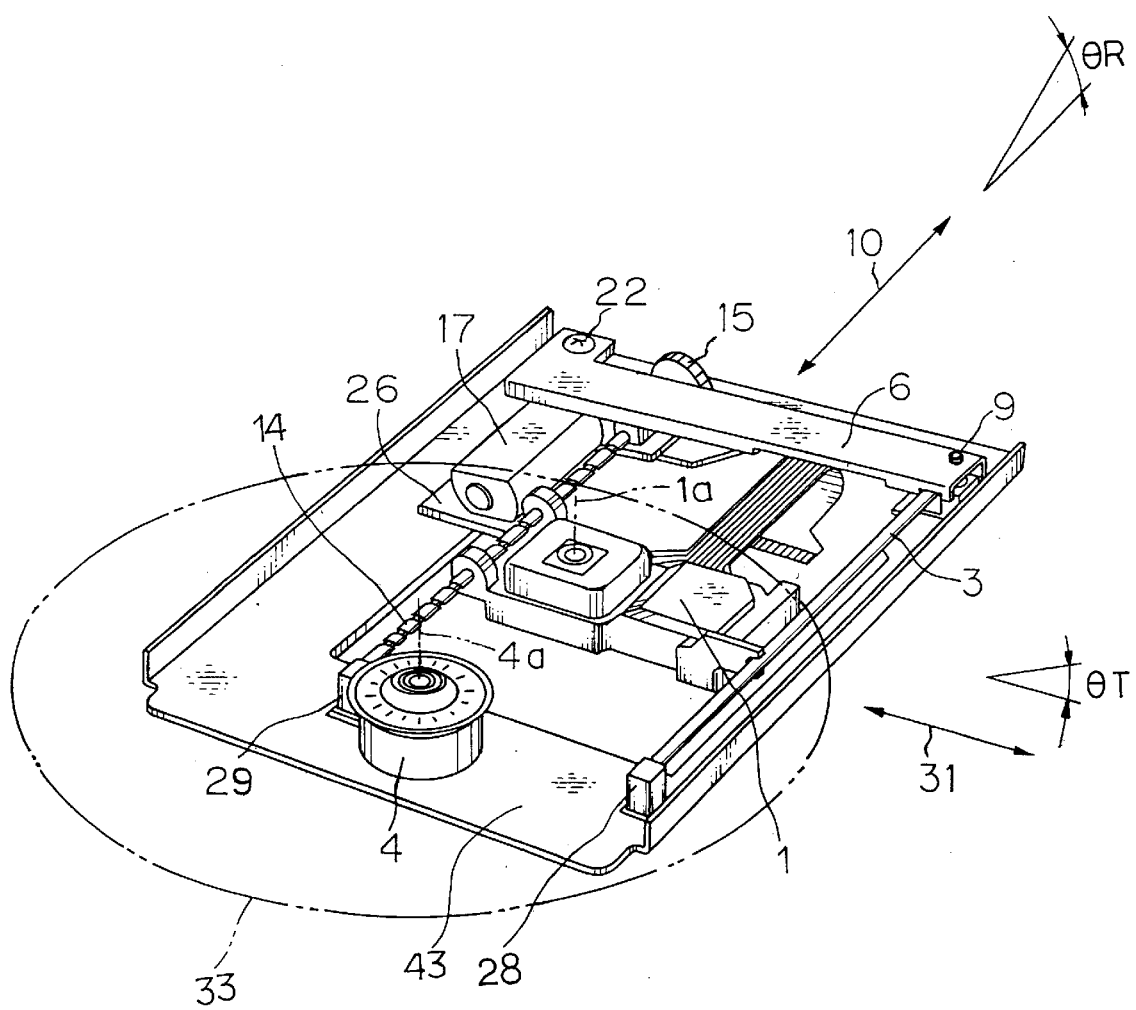
FIG. 8 is a perspective view of the optical head adjusting apparatus of the fourth embodiment of the invention.

FIG. 7 is an exploded perspective view showing the configuration of an optical head adjusting apparatus of the fourth embodiment, and FIG. 8 is an assembly perspective view.

Referring to FIG. 7 and FIG. 8, the disk motor 4 which rotatably supports the optical disk 33 is fixed to a base frame 43. The feeding gear 15 is attached to the end portion 14b of the feed screw shaft 14. The vicinity of the end portion 14b is supported by a sub-frame 26 via a bearing support member 30. A sliding member 23 having a hole is disposed on the sub-frame 26. The base frame 43 has a pin 25. The pin 25 is inserted into the hole of the sliding member 23 with interposing a coil spring 24 therebetween. The sliding member 23 is pressed toward the base frame 43 against the compression force of the coil spring 24 by an adjusting screw 22 of an adjustment holder 6. The other end portion 14a of the feed screw shaft 14 is rotatably supported in substantially parallel with the radial direction 10 by a bearing support member 29 which is disposed on the base frame 43 in the vicinity of the disk motor 4. The guide shaft 3 is supported in substantially parallel with the radial direction 10 by the guide shaft support member 28 and the supporting part 32 disposed on the base frame 43. The optical head 1 is supported by the feed screw shaft 14 and the guide shaft 3 which are disposed in substantially parallel with the radial direction 10 of the optical disk 33.

A feed motor 17 provided with the driving gear 16 is fixed to the sub-frame 26 so that the feeding gear 15 engages with the driving gear 16.

The screw engaging member 18 is fixed to a side face of the optical head 1. An engaging portion 18a of the screw engaging member 18 is pressed against the screw portion 14c of the feed screw shaft 14 so as to engage therewith.

When the feed screw shaft 14 is rotated by the rotation of the feed motor 17, the screw engaging member 18 engaging with the screw portion 14c of the feed screw shaft 14 is given a driving force in the axial direction of the feed screw shaft 14.

As a result, the optical head 1 is moved in the radial direction 10 of the optical disk 33.

The end portion 14a of the feed screw shaft 14 and the end portion 3a of the guide shaft 3 which are closer to the disk motor 4 and serve as fulcrums are pivotally supported by the bearing support member 29 and the guide shaft support member 28 which are fixed to the base frame 43, so as to locate on a plane which is perpendicular to the radial direction 10 and has thereon the rotation axis 4a of the disk motor 4, respectively.

The sub-frame 26 is clamped by the adjusting screw 22 attached to the adjustment holder 6 and the coil spring 24, via the sliding member 23. The fixation of the adjustment holder 6 to the base frame 43 causes the pin 25 disposed on the base frame 43 to be inserted into the sliding member 23, thereby enabling the sub-frame 26 to move in a direction perpendicular to the face of the optical disk 33.

The other end portion 3b of the guide shaft 3 is clamped by the coil spring 7 and the adjusting screw 9 attached to the adjustment holder 6. The fixation of the adjustment holder 6 to the base frame 43 causes the other end portion 3b to engage with the groove-like portion of the supporting part 32 which is disposed on the base frame 43, thereby enabling the other end portion 3b to move in a direction perpendicular to the face of the optical disk 33.

In the guide shaft adjustment mechanism for the guide shaft 3 and the sub-frame 26, when the adjusting screws 22 and 9 are rotated, the feed screw shaft 14 and the guide shaft 3 swing about the end portion 14a of the feed screw shaft 14 and the end portion 3a of the guide shaft 3, respectively, so that the other ends 14b and 3b move upward or downward with respect to the face of the base frame 43.

The optical head adjusting apparatus operates in the following manner.

The feed screw shaft 14 and the guide shaft 3 are simultaneously swing about the end portion 14a of the feed screw shaft 14 and the end portion 3a of the guide shaft 3 by concurrently rotating the adjusting screws 22 and 9, respectively. As a result, the inclination of the optical head 1 supported by the feed screw shaft 14 and the guide shaft 3 is changed with respect to the radial direction 10.

According to this operation, the inclination of the optical head with respect to the radial direction 10 can be changed by a radial adjust angle θR, so that the angle formed by the face of the optical disk 33 and the optical axis 1a in the radial direction 10 is adjusted to 90 deg.

Next, description is made as to the operation in the case where the inclination of the optical head 1 with respect to the tangential direction 31 of the optical disk is adjusted.

For example, the adjusting screw 9 is rotated so that only the guide shaft 3 swings about the end portion 3a of the guide shaft 3, thereby upward or downward moving the end portion 3b with respect to the face of the optical disk 33. As a result, the guide shaft 3 is inclined with respect to the feed screw shaft 14, and the inclination of the optical head 1 supported by the feed screw shaft 14 and the guide shaft 3 is changed with respect to the tangential direction 31.

According to this operation, the inclination of the optical head 1 with respect to the tangential direction 31 can be changed by a tangential adjust angle θT, so that the angle formed by the optical disk 33 and the optical axis 1a in the tangential direction 31 is adjusted to 90 deg.

Since the inclination adjustments of the optical head 1 with respect to the radial direction 10 and the tangential direction 31 are independently conducted as described above, the angles formed by the face of the optical disk 33 and the optical axis 1a of the optical head 1 can be adjusted to 90 deg. Therefore, satisfactory states of recording and reproducing operations can be realized in an optical disk apparatus.

The bearing support member 29 and the guide shaft support member 28 are disposed on the base frame 43 on the plane which is perpendicular to the radial direction 10 and has thereon the rotation axis 4a of the disk motor 4. Even when the inclination of the optical head 1 is adjusted, therefore, the relative gap variation does not occur between the optical head 1 and the optical disk 33.

As a result, an inclination angle adjustment can be realized within the movable range of the objective lens (not shown) mounted on the optical head 1, so that the optical disk apparatus can satisfactorily perform recording and reproducing operations.

Also when the optical head 1 is inclined by the radial adjust angle θR as a result of the inclination angle adjusting operation, the sub-frame 26 is moved in a direction perpendicular to the face of the optical disk 33 so as to move the bearing support member 30 rotatably supporting the feed screw shaft 14, and the feed motor 17 to which the driving gear 16 engaging with the feeding gear 15 are fixed. Therefore, the state of the transmission system of the feeding mechanism including the feed screw shaft 14, the feeding gear 15 and the driving gear 16 is entirely unchanged.

As a result, a stable high-speed-access operation of the optical head 1 can be realized without being affected by an operation of adjusting the inclination angle of the optical head 1.

In the first, second, third and fourth embodiments of the invention described above, it is preferable to conduct the adjustment of the inclination of the optical head 1 in the state where the optical head 1 is held at a radial intermediate position of an information area of the optical disk 33. Hereinafter, reason of the above and operation principle will be described with reference to accompanying drawings.

Figure 9A:
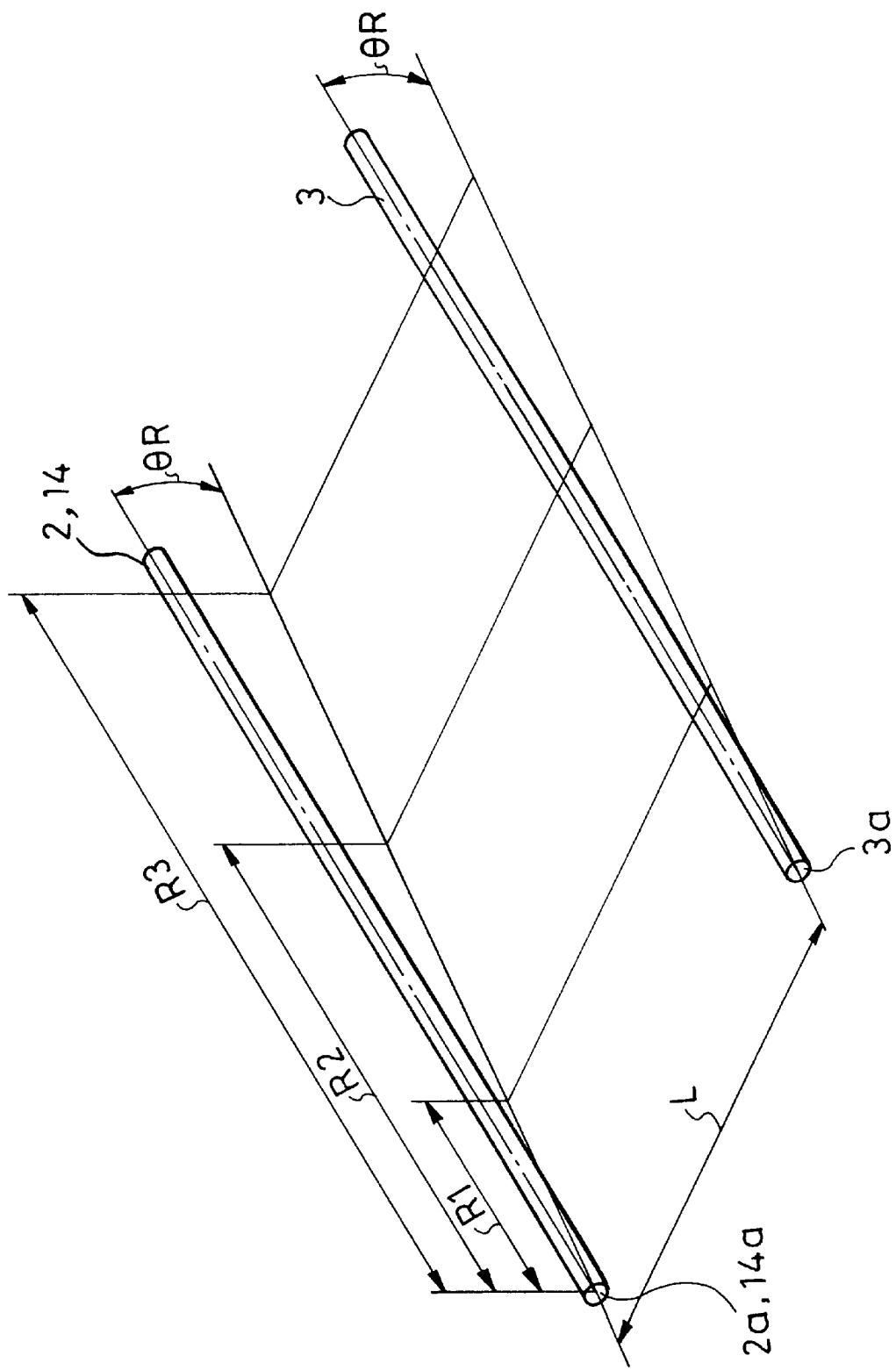
FIG. 9A is a perspective view of main portions showing the operation principle of a guide shaft adjustment mechanism in the predetermined radial direction.
Figure 9B:
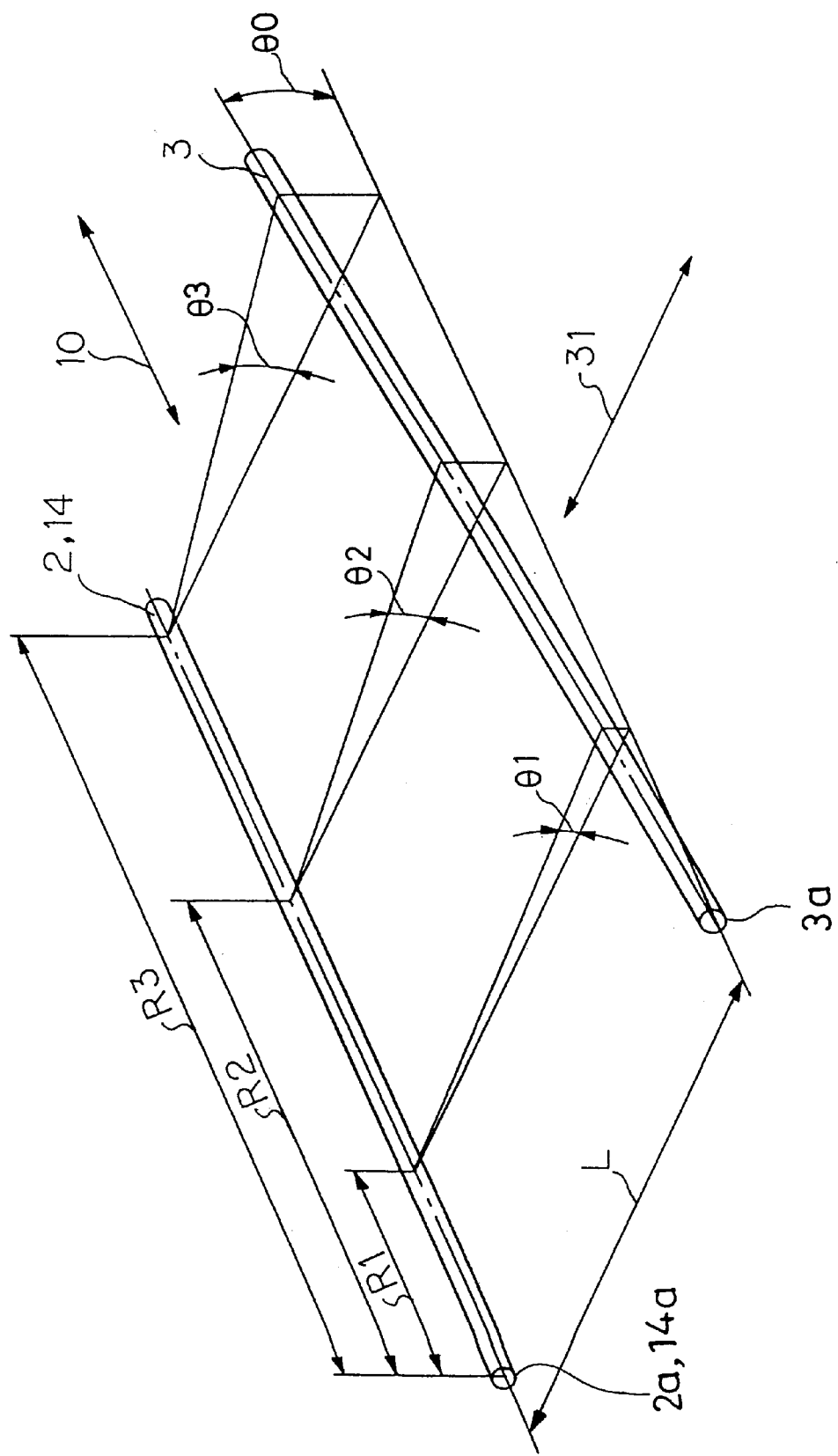
FIG. 9B is a perspective view of main portions showing the operation principle of a guide shaft adjustment mechanism in the tangential direction.
Figure 10A:
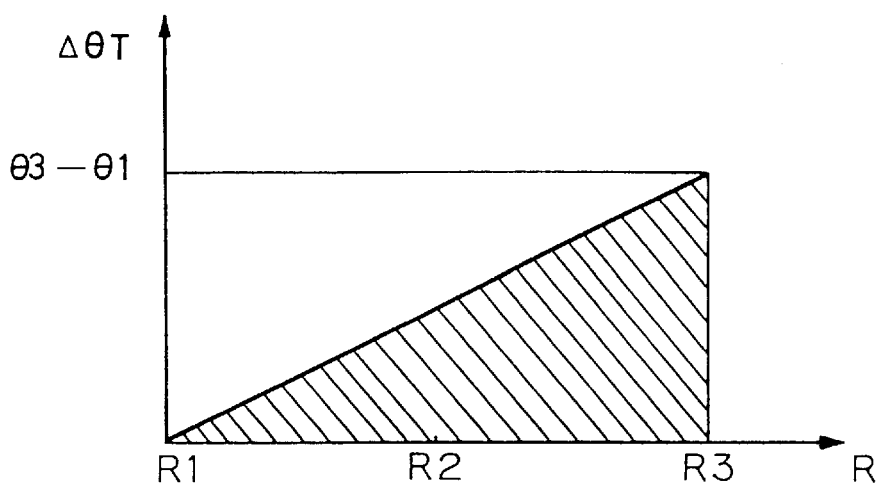
FIGS. 10A, 10B and 10C are graphs showing the distribution of an angle error $\Delta\theta T$ of tangential adjustment.
Figure 10B:
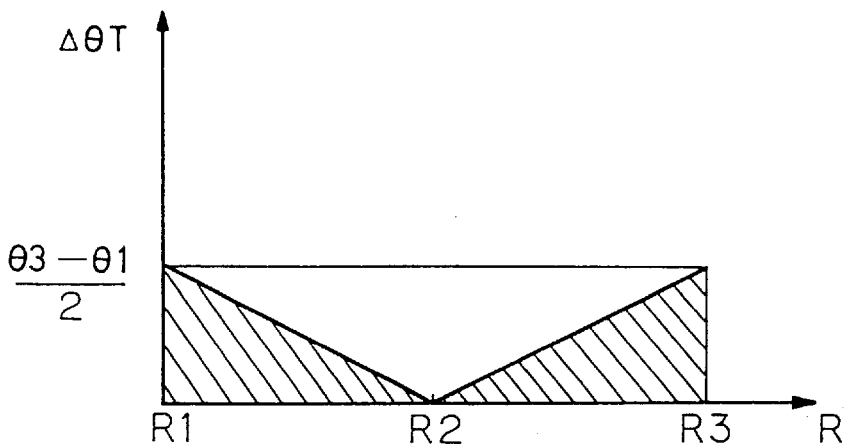
Figure 10C:
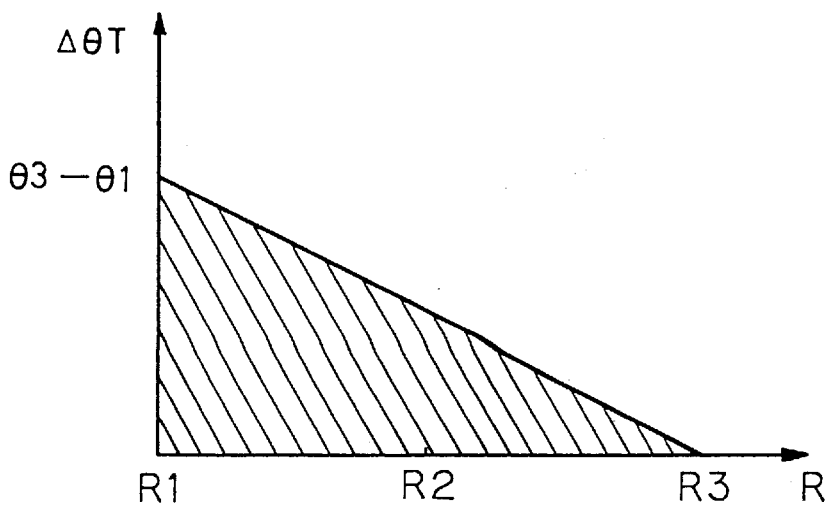
Figure 11:
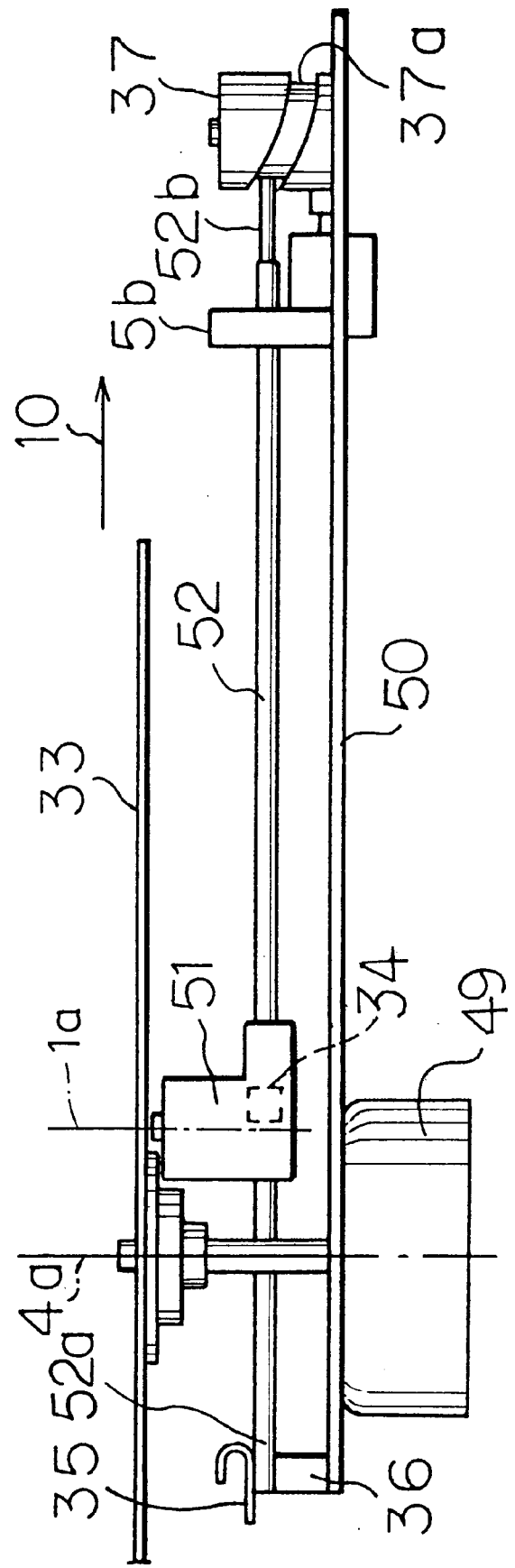
FIG. 11 is the side view of the prior art optical head adjusting apparatus disclosed in the Japanese published unexamined patent application Hei 2-94115.
Figure 12:
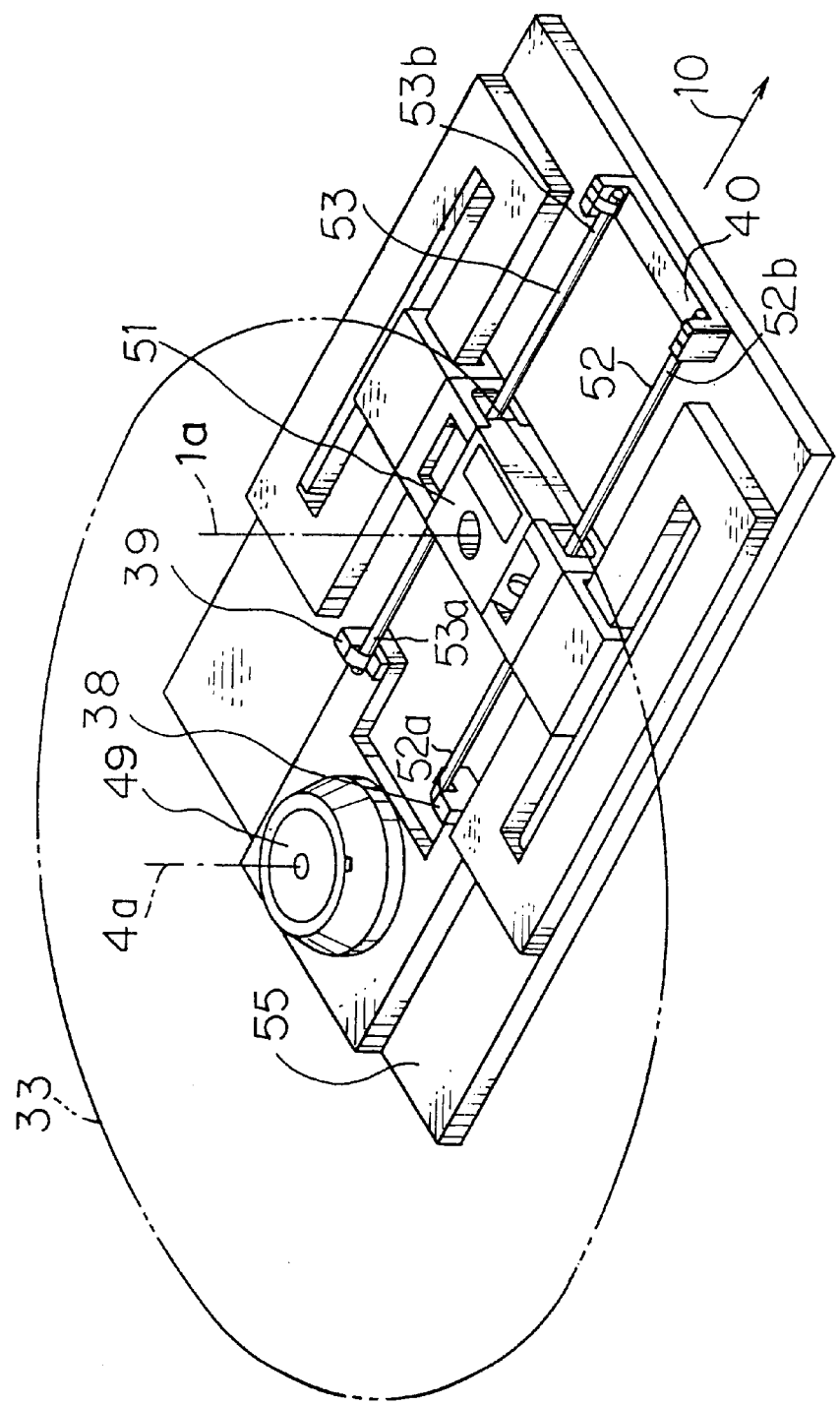
FIG. 12 is the perspective view of the prior art optical head adjusting apparatus disclosed in the Japanese published unexamined patent application Hei 7-320290.
Figure 13:
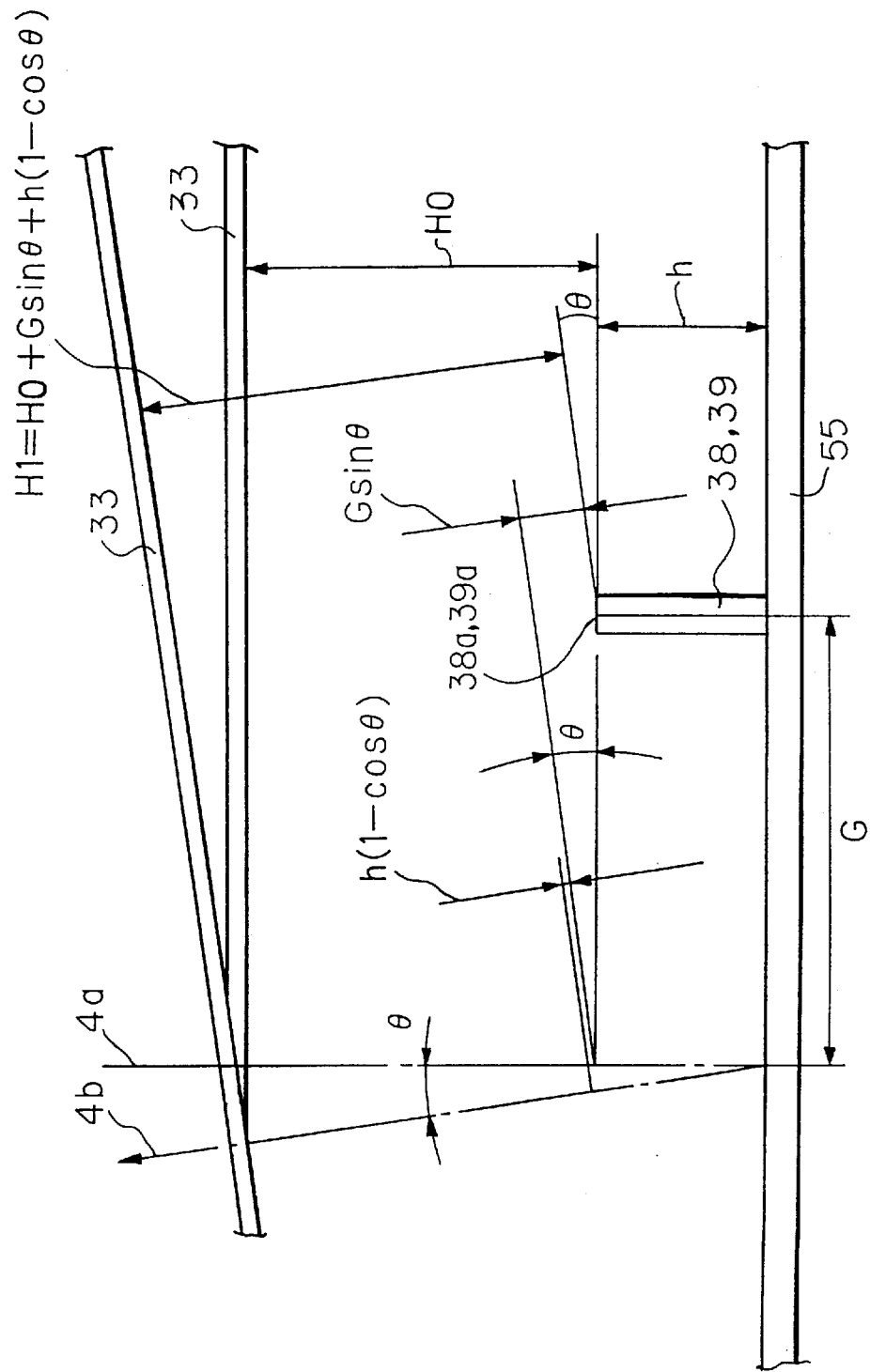
FIG. 13 is the side view of main portions illustrating relative gap variation of the optical head in the optical head adjusting apparatus of the prior art.

FIG. 9A and FIG. 9B are perspective views of main portions showing the operation principle of a guide shaft adjustment mechanism. FIG. 10A, FIG. 10B, and FIG. 10C are graphs showing the distribution of an angle error ΔθT in the tangential adjustment.

FIG. 9A is a perspective view showing the guide shaft 2 and the guide shaft 3 in the first and second embodiments and the feed screw shaft 14 in the third and fourth embodiments which conduct the inclination adjustment of the optical head 1 with respect to the radial direction 10.

In the figure, L indicates a preset distance between the two guide shafts 2 and 3 or that between the guide shaft 3 and the feed screw shaft 14. R1 indicates the radius of the innermost track of the information area of the optical disk 33, R2 indicates the radius of an intermediate position of the information area of the optical disk, and R3 indicates the radius of the outermost track of the information area of the optical disk.

In the adjustment of the inclination angle of the optical head 1 in the radial direction 10 of the optical disk, the guide shafts 3 and 2, or the guide shaft 3 and the feed screw shaft 14 are simultaneously swung so as to be inclined. Since the fulcrums of the swinging operations are at the end portions 2a, 3a, and 14a of the guide shafts 2 and 3 and the shaft 14, respectively, the radial adjust angle θR is constant irrespective of the positions of the radii R1, R2, and R3. In other words, in the angle adjustment with respect to the radial direction 10, an adjustment error due to the positions of the radii R1, R2 and R3 does not principally occur.

Next, the adjustment of an inclination angle of the optical head 1 with respect to the tangential direction 31 of the optical disk (hereinafter, the angle is referred to as "the tangential angle") will be described.

FIG. 9B shows a state where, in order to adjust the tangential angle, the guide shaft 3 is inclined by an angle θ0 with respect to the guide shaft 2 or the feed screw shaft 14 with setting the end portion 3a of the guide shaft 3 as the fulcrum. The tangential angles θ1, θ2 and θ3 at the respective positions of the radii R1, R2 and R3 are indicated by expression 5.

$$\left.\begin{array}{l}\theta 1 = R1 \cdot \theta 0 / L \\ \theta 2 = R2 \cdot \theta 0 / L \\ \theta 3 = R3 \cdot \theta 0 / L\end{array}\right\} \quad (5)$$

$$R2 = \frac{R1 + R3}{2} \quad (6)$$

When expression 6 indicating relationship among the radii R1, R2 and R3 is substituted into expression 5, expression 7 indicating relationship among the tangential angles θ1, θ2 and θ3 is obtained.

$$\theta 2 = \frac{\theta 1 + \theta 3}{2} \quad (7)$$

FIG. 10A is a graph showing the distribution of a tangential adjustment angle error ΔθT where the adjustment of the tangential angle is conducted in the state that the optical head 1 is held to the position of the radius R1.

At the position of the radius R1, the tangential adjustment angle error ΔθT does not occur. By contrast, at the position of the radius R3, a tangential adjustment angle error indicated by expression 8 occurs.

$$\theta 3 - \theta 1 \quad (8)$$

FIG. 10C is a graph showing the distribution of the tangential adjustment angle error ΔθT where the adjustment of the tangential angle is conducted in the state that the optical head 1 is held to the position of the radius R3. At the position of the radius R3, the tangential adjustment angle error ΔθT does not occur. By contrast, at the position of the radius R1, the tangential adjustment angle error indicated by expression 8 occurs.

Under the state where the optical head 1 is held at the position of the radius R2, as shown in FIG. 10B, the tangential adjustment angle error ΔθT at the positions of the radii R1 and R3 are indicated by expression 9 from the relationship of expression 7.

$$\frac{\theta 3 - \theta 1}{2} \quad (9)$$

Therefore, the tangential adjustment angle error ΔθT can be made minimum by adjusting the inclination angle of the optical head 1 in the tangential direction 31 of the optical disk 33 in the state where the optical head 1 is held at the radial intermediate position of the information area of the optical disk 33.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. An optical head adjusting apparatus comprising:

a disk motor for rotatably supporting an optical disk;

a base frame for fixing said disk motor;

an optical head for forming an optical spot on said rotating optical disk, and for recording information into or reproducing information from said optical disk;

a pair of guide shafts for supporting said optical head so as to allow moving of said optical head in a predetermined radial direction of said optical disk;

driving means for moving said optical head in said predetermined radial direction;

guide shaft support members for pivotally supporting one ends of said pair of guide shafts on said base frame, said guide shaft support members being located on a plane which is perpendicular to said predetermined radial direction and has thereon the rotation axis of said disk motor; and a guide shaft adjustment mechanism disposed on said base frame, so as to support the other ends of said pair of guide shafts and move in a direction substantially perpendicular to the face of said optical disk.

2. An optical head adjusting apparatus comprising:

a disk motor for rotatably supporting an optical disk;

a base frame for fixing said disk motor;

an optical head for forming an optical spot on said rotating optical disk, and for recording information into or for reproducing information from said optical disk;

a feed screw shaft for supporting said optical head so as to allow linear moving of said optical head in a predetermined radial direction of said optical disk;

a feed motor for driving said feed screw shaft via rotation transmission means, said feed motor being fixed on said base frame;

a screw engaging member for engaging with a screw portion of said feed screw shaft so as to be given a driving force in an axial direction of said feed screw shaft by rotation of said feed screw shaft, said screw engaging member being fixed to said optical head;

a guide shaft disposed in substantially parallel with said predetermined radial direction, and for supporting said optical head so as to allow moving of said optical head in said predetermined radial direction;

a first bearing member for rotatably supporting one end of said feed screw shaft on said base frame, said first bearing member being located on a plane which is perpendicular to said predetermined radial direction and has thereon the rotation axis of said disk motor;

a guide shaft support member for pivotally supporting one end of said guide shaft on said base frame, said guide shaft support member being located on said plane;

a second bearing member for rotatably supporting the other end of said feed screw shaft; and a guide shaft adjustment mechanism disposed on said base frame so as to movably support the other end of said guide shaft and said second bearing member in a direction substantially perpendicular to the face of said optical disk.

3. An optical head adjusting apparatus comprising:

a disk motor for rotatably supporting an optical disk;

a first base frame for fixing said disk motor;

an optical head for forming an optical spot on said rotating optical disk, and for recording information onto or reproducing information from said optical disk;

a feed screw shaft for supporting said optical head so as to allow linear moving of said optical head in a predetermined radial direction of said optical disk;

a feed motor for rotating said feed screw shaft via rotation transmission means;

a screw engaging member for engaging with a screw portion of said feed screw shaft so as to be given a driving force in an axial direction of said feed screw shaft by rotation of said feed screw shaft, said screw engaging member being fixed to said optical head;

a guide shaft disposed in substantially parallel with said predetermined radial direction, and for movably supporting said optical head so as to allow moving of said optical head in said predetermined radial direction;

a first bearing member for rotatably supporting one end of said feed screw shaft on said first base frame, said first bearing member being located on a plane which is perpendicular to said predetermined radial direction and has thereon the rotation axis of said disk motor;

a guide shaft support member for pivotally supporting one end of said guide shaft on said base frame, said guide shaft support member being located on said plane;

a first guide shaft adjustment mechanism disposed on said first base frame so as to movably support the other end of said guide shaft in a direction substantially perpendicular to the face of said optical disk;

a second bearing member for rotatably supporting the other end of said feed screw shaft; and a second guide shaft adjustment mechanism disposed on a sub-frame having said second bearing member and said feed motor, said sub-frame being supported by said base frame so as to move said sub-frame in a direction substantially perpendicular to the face of said optical disk.

4. An optical head adjusting apparatus in accordance with claim 1, wherein said driving means for moving said optical head in said predetermined radial direction of said optical disk comprises:

a driving coil disposed on said optical head; and a magnetic circuit fixed on said base frame so that said magnetic circuit is inserted into said driving coil, and a magnetic flux direction coincides with a tangential direction perpendicular to said predetermined radial direction of said optical disk.

5. An optical head adjusting apparatus in accordance with claim 1, wherein said driving means for moving said optical head in said predetermined radial direction of said optical disk comprises:

a feed screw shaft disposed in parallel with said pair of guide shafts so as to allow linear moving of said optical head in said predetermined radial direction of said optical disk;

a feed motor for rotating said feed screw shaft, said feed motor being fixed on said base frame, and directly coupled to said feed screw shaft, or coupled via rotation transmission means; and a screw engaging member for engaging with a screw portion of said feed screw shaft by abutting in a direction perpendicular to said predetermined radial direction so as to be given a driving force in an axial direction of said feed screw shaft by rotation of said feed screw shaft, said engaging member being fixed to said optical head.

6. An optical head adjusting apparatus in accordance with claim 1, wherein inclination of said optical head with respect to said predetermined radial direction of said optical disk is adjusted by simultaneously moving both said ends of said guide shafts in a direction substantially perpendicular to the face of said optical disk, and inclination of said optical head with respect to the tangential direction of said optical disk which is perpendicular to said predetermined radial direction is adjusted by moving one end of at least one of said guide shafts in a direction substantially perpendicular to the face of said optical disk.

7. An optical head adjusting apparatus in accordance with claim 2, wherein inclination of said optical head with respect to said predetermined radial direction of said optical disk is adjusted by simultaneously moving one end of said guide shaft and said second bearing member in a direction substantially perpendicular to the face of said optical disk, and inclination of said optical head with respect to the tangential direction of said optical disk which is perpendicular to said predetermined radial direction is adjusted by moving one of the end of said guide shaft or said second bearing member in a direction substantially perpendicular to the face of said optical disk.

8. An optical head adjusting apparatus in accordance with claim 3, wherein inclination of said optical head with respect to said predetermined radial direction of said optical disk is adjusted by simultaneously moving one end of said guide shaft and said sub-frame member in a direction substantially perpendicular to the face of said optical disk, and inclination of said optical head with respect to the tangential direction of said optical disk which is perpendicular to said predetermined radial direction is adjusted by moving one of the end of said guide shaft or said sub-frame in a direction substantially perpendicular to the face of said optical disk.

9. An optical head adjusting apparatus in accordance with claim 1, wherein said guide shaft adjustment mechanism comprises a bearing member for rotatably supporting said feed screw shaft, said bearing member is clamped by a spring member and an adjusting screw in a direction substantially perpendicular to the face of said optical disk.

10. An optical head adjusting apparatus in accordance with claim 2, wherein said guide shaft adjustment mechanism comprises a bearing member for rotatably supporting said feed screw shaft, said bearing member is clamped by a spring member and an adjusting screw in a direction substantially perpendicular to the face of said optical disk.

11. An optical head adjusting apparatus in accordance with claim 3, wherein said guide shaft adjustment mechanism comprises a bearing member for rotatably supporting said feed screw shaft, said bearing member is clamped by a spring member and an adjusting screw in a direction substantially perpendicular to the face of said optical disk.

12. An optical head adjusting apparatus in accordance with claim 2, wherein, said rotation transmission means comprises a contractible belt for connecting between said feed screw shaft and a rotating shaft of said feed motor, thereby transmitting the driving force.

13. An optical head adjusting apparatus in accordance with claim 1, wherein said optical head is held at an intermediate radial position of an information area of said optical disk, when an inclination of said optical head is adjusted by said guide shaft adjustment mechanism.

14. An optical head adjusting apparatus in accordance with claim 2, wherein said optical head is held at an intermediate radial position of an information area of said optical disk, when an inclination of said optical head is adjusted by said guide shaft adjustment mechanism.

15. An optical head adjusting apparatus in accordance with claim 3, wherein said optical head is held at an intermediate radial position of an information area of said optical disk, when an inclination of said optical head is adjusted by said guide shaft adjustment mechanism.

* * * * *